United States Patent
Jiang et al.

(10) Patent No.: US 10,915,532 B2
(45) Date of Patent: *Feb. 9, 2021

(54) SUPPORTING A JOIN OPERATION AGAINST MULTIPLE NOSQL DATABASES

(71) Applicant: International Business Machines Corporation, Armonk, NY (US)

(72) Inventors: Peng Hui Jiang, Beijing (CN); Chun Hui Wang, Beijing (CN); Zan Zhou, Beijing (CN); Xin Peng Liu, Beijing (CN); Shuo Li, Beijing (CN); Xin Zhe Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/452,426

(22) Filed: Jun. 25, 2019

(65) Prior Publication Data
US 2019/0310978 A1    Oct. 10, 2019

Related U.S. Application Data

(63) Continuation of application No. 15/941,697, filed on Mar. 30, 2018.

(51) Int. Cl.
*G06F 16/2455* (2019.01)
*G06F 16/28* (2019.01)
(Continued)

(52) U.S. Cl.
CPC ........ *G06F 16/2456* (2019.01); *G06F 16/211* (2019.01); *G06F 16/2228* (2019.01);
(Continued)

(58) Field of Classification Search
CPC ..... Y10S 707/99943; Y10S 707/99935; Y10S 707/954; Y10S 707/957; Y10S 707/99932;
(Continued)

(56) References Cited

U.S. PATENT DOCUMENTS 8,868,544 B2 * 10/2014 Witkowski ............ G06F 16/283
707/713
8,903,872 B1 * 12/2014 Weissman .......... G06Q 30/0627
705/5
(Continued)

FOREIGN PATENT DOCUMENTS

CN        104794247 A      7/2015

OTHER PUBLICATIONS

Xiang et al.; "Providing R-Tree Support for MongoDB";Jul. 2016 (Year: 2016).*

(Continued)

*Primary Examiner* — Dennis Truong
(74) *Attorney, Agent, or Firm* — Konrad Raynes Davda & Victor LLP; Janaki K. Davda

(57) ABSTRACT

Provided are techniques for supporting a join operation against multiple NoSQL databases. A search request with a field and a value for the field is received, wherein the search request is to be issued against a plurality of database divisions formed from NoSQL databases. A simple database search is performed against a structured index to generate a first result set. An extended database search is performed against a linear database division index to generate a second result set by: identifying a relationship for the field that identifies related fields and identifying documents for the field and the related fields using a linear database division index. The first result set and the second result set are merged to form a merged result set of documents. The documents from the merged result set are displayed in response to the search request.

7 Claims, 23 Drawing Sheets

(51) Int. Cl.
*G06F 16/93* (2019.01)
*G06F 16/21* (2019.01)
*G06F 16/22* (2019.01)
*G06F 16/80* (2019.01)
*G06F 16/95* (2019.01)
*G06F 16/2453* (2019.01)
*G06F 16/242* (2019.01)

(52) U.S. Cl.
CPC .............. *G06F 16/28* (2019.01); *G06F 16/93* (2019.01); *G06F 16/2246* (2019.01); *G06F 16/242* (2019.01); *G06F 16/24544* (2019.01); *G06F 16/80* (2019.01); *G06F 16/95* (2019.01)

(58) Field of Classification Search
CPC ..... Y10S 707/99934; Y10S 707/99933; Y10S 707/99942; Y10S 707/99931; Y10S 707/99944; Y10S 707/99954; G06F 16/283; G06F 16/2455; G06F 16/24539; G06F 16/24556; G06F 16/30; G06F 16/284; G06F 16/211; G06F 16/2246; G06F 16/2452; G06F 16/2456; G06F 16/28; G06F 16/00; G06F 16/2393; G06F 16/2423; G06F 16/243; G06F 16/245; G06F 16/2453; G06F 16/24553; G06F 16/2477; G06F 16/25; G06F 16/254; G06F 16/258; G06F 16/288; G06F 16/289; G06F 16/31; G06F 16/84; G06F 16/9032; G06F 16/93; G06F 16/2228
See application file for complete search history.

(56) References Cited

U.S. PATENT DOCUMENTS

| | | | | |
|---|---|---|---|---|
| 9,268,834 B2* | 2/2016 | Aguilera | ............. | G06F 16/2445 |
| 2007/0192295 A1* | 8/2007 | Bakalash | .......... | C03B 37/02718 |
| 2011/0258178 A1* | 10/2011 | Eidson | .............. | G06F 17/30477 |
| | | | | 707/714 |
| 2011/0258179 A1* | 10/2011 | Weissman | ......... | G06F 16/24537 |
| | | | | 707/714 |
| 2012/0317093 A1 | 12/2012 | Teletia et al. | | |
| 2015/0088868 A1* | 3/2015 | Jordan | .................. | G06F 16/248 |
| | | | | 707/722 |
| 2017/0109404 A1* | 4/2017 | Ayyagari | ............ | G06F 16/2282 |
| 2017/0344588 A1* | 11/2017 | Horowitz | ............ | G06F 16/2228 |

OTHER PUBLICATIONS

Kriha et al. "NoSQL Databases"; Stuttgart Media University; 2011 (Year: 2011).*

Fox et al. "Spatio-temporal Indexing in Non-relational Distributed Databases" IEEE International Conference on Big Data; 2013 (Year: 2013).*
English Abstract and Machine Translation for CN104794247A, published on Jul. 22, 2015, Total 14 pp.
Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.
Mell, P. and T. Grance, "The NIST Definition of Cloud Computing (Draft)", Sep. 2011, Computer Security Division Information Technology Laboratory National Institute of Standards and Technology, Total 7 pp.
Peter, C., "Supporting the Join Operation in a NoSQL System", Master of Science in Informatics, Submission date: May 2015, Norwegian University of Science and Technology, Department of Computer and Information Science, Total 118 pp.
Quora, "How are Joins Supported by SQL but not in NoSQL Databases?", [online], [Retrieved on Aug. 31, 2017]. Retrieved from the Internet at <URL: https://www.quora.com/How-are-joins-supported-by-SQL-but-not-in-NoSQL-databases>, Total 3 pp.
Stack Overflow, "Google's Bigtable vs. A Relational Database", [online], [Retrieved on Feb. 26, 2018], Stack Overflow, edited May 23 2017. Retrieved from the Internet at <URL: https://stackoverflow.com/questions/782913/googles-bigtable-vs-a-relational-database>, Total 3 pp.
Stack Overflow, "SQL—Join Operation with NOSQL", [online], [Retrieved on Aug. 31, 2017], Stack Overflow. Retrieved from the Internet at <URL: https://stackoverflow.com/questions/1995216/join-operation-with-nosql>, Total 2 pp.
List of IBM Patents or Patent Applications Treated as Related, Jun. 26, 2019, 2 pp. [57.420C1 (Appendix P)].
U.S. Appl. No. 15/941,697, filed Mar. 30, 2018, 53 pp. [57420 (Appln)].
Preliminary Amendment for U.S. Appl. No. 15/941,697, filed Jun. 26, 2019, 6 pp. [57.420 (PrelimAmend)].
Office Action 1 for U.S. Appl. No. 15/941,697, 17 pp., dated Jan. 22, 2020. [57A20 (OA1)].
Response to Office Action 1 for U.S. Appl. No. 15/941,697, 9 pp., dated Apr. 21, 2020. [57A20 (ROA1)].
Notice of Allowance 1 for U.S. Appl. No. 15/941,697, 15 pp., dated Jul. 1, 2020. [57.420 (NOA1)].
Fox, A., et al., "Spatio-Temporal Indexing in Non-Relational Distributed Databases", 2013 IEEE International Conference on Big Data, 2013, 9 pp.
Strauch, C., "NoSQL Databases", Stuttgart Media University, 2011, 153 pp.
Xiang, L., et al., "Providing R-Tree Support for MongoDB", The International Archives of the Photogrammetry, Remote Sensing and Spatial Information Sciences, vol. XLI-B4, Jul. 2016, 5 pp.

* cited by examiner

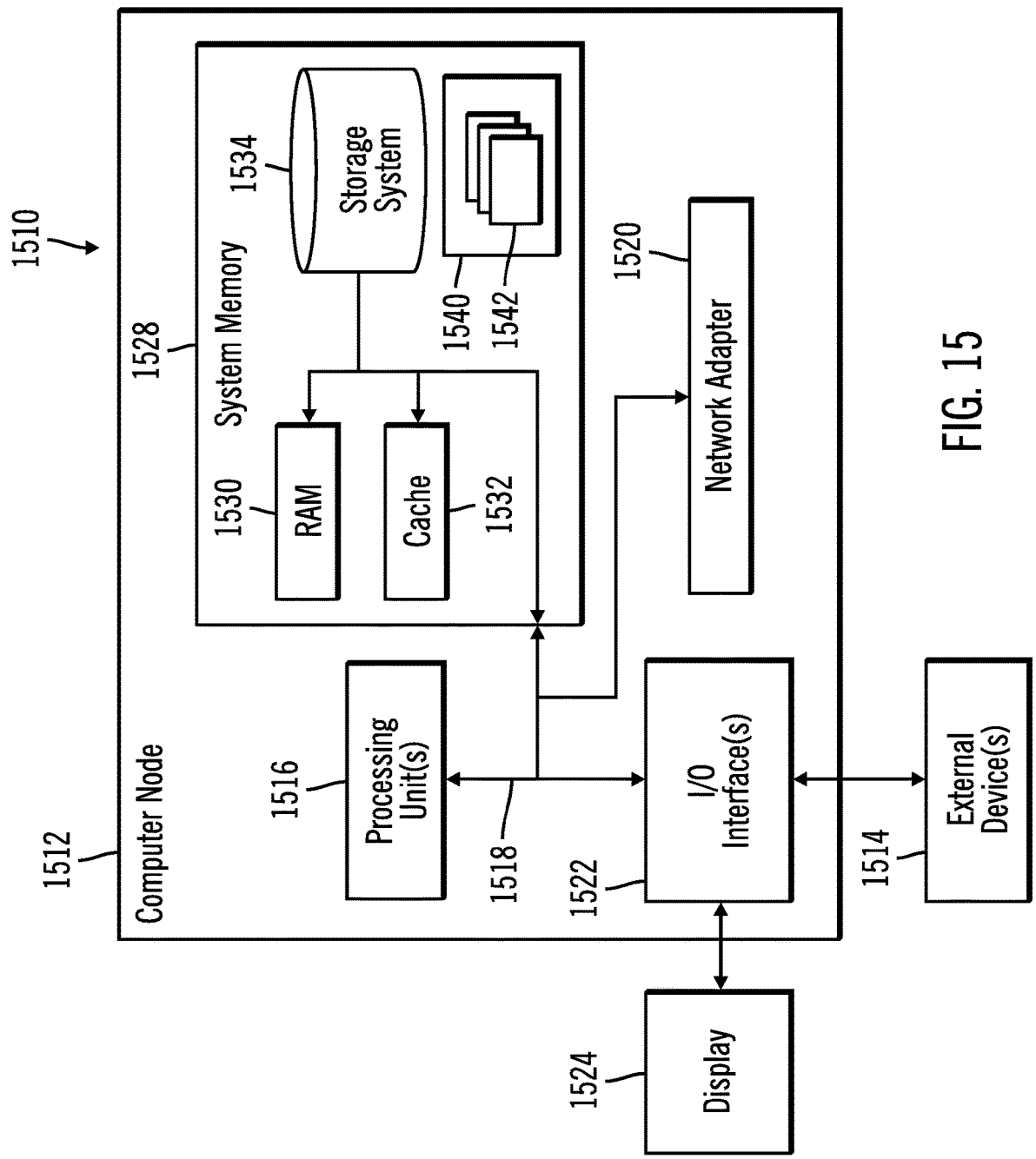

SUPPORTING A JOIN OPERATION AGAINST MULTIPLE NOSQL DATABASES

FIELD

Embodiments of the invention relate to supporting a join operation against multiple NoSQL databases.

BACKGROUND

Relational DataBase Management System (RDBMS) software may use a Structured Query Language (SQL) interface. A RDBMS uses relational techniques for storing and retrieving data in a relational database. Relational databases are organized into tables that consist of rows (also referred to as tuples or records) and columns (also referred to as fields or attributes) of data. A join operation may be described as joining columns from multiple tables to form a new table or set of rows. The join operation in SQL is popular and fully supported because there is a long history and an evolution path for an RDBMS, especially with the fixed data structure in SQL.

On the other hand, NoSQL may be described as "no SQL" or "non relational". For example, NoSQL may store data in documents, rather than tables. However, NoSQL also uses schemas to describe the organization of data in a NoSQL database. Considering that the data in a NoSQL database is associated with a flexible schema, it is not easy to find a relationship of different fields of documents in different databases and there is no existing support for join operation behavior of two databases for similar fields.

Current systems apply the join operation against multiple databases with implementation at an application level at the client computer. However, there are multiple drawbacks to this, including complex logic to be written at the application level, the network cost and additional performance cost to transfer intermediate data from the server computer to the client computer, working with relationships in the NoSQL databases that may not be fixed, and the difficulty in modifying the application to adapt to a new data structure.

SUMMARY

In accordance with embodiments, a computer-implemented method is provided for supporting a join operation against multiple NoSQL databases. The computer-implemented method comprises: receiving, with a processor of a computer, a search request with a field and a value for the field, wherein the search request is to be issued against a plurality of database divisions formed from NoSQL databases; performing a simple database search against a structured index to generate a first result set; performing an extended database search against a linear database division index to generate a second result set by: identifying a relationship for the field, wherein the field is in a database division of the plurality of database divisions, and wherein the relationship identifies related fields in other database divisions and identifying documents using a linear database division index to search for the value in the related fields, wherein the linear database division index has a database division index for each of the plurality of database divisions, and wherein each database division index has entries for a value and an associated document; merging the first result set and the second result set to form a merged result set of documents; and displaying the documents from the merged result set in response to the search request.

In accordance with other embodiments, a computer program product is provided for supporting a join operation against multiple NoSQL databases. The computer program product comprising a computer readable storage medium having program code embodied therewith, the program code executable by at least one processor to perform operations comprising: receiving a search request with a field and a value for the field, wherein the search request is to be issued against a plurality of database divisions formed from NoSQL databases; performing a simple database search against a structured index to generate a first result set; performing an extended database search against a linear database division index to generate a second result set by: identifying a relationship for the field, wherein the field is in a database division of the plurality of database divisions, and wherein the relationship identifies related fields in other database divisions and identifying documents using a linear database division index to search for the value in the related fields, wherein the linear database division index has a database division index for each of the plurality of database divisions, and wherein each database division index has entries for a value and an associated document; merging the first result set and the second result set to form a merged result set of documents; and displaying the documents from the merged result set in response to the search request.

In yet other embodiments, a computer system is provided for supporting a join operation against multiple NoSQL databases. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: receiving a search request with a field and a value for the field, wherein the search request is to be issued against a plurality of database divisions formed from NoSQL databases; performing a simple database search against a structured index to generate a first result set; performing an extended database search against a linear database division index to generate a second result set by: identifying a relationship for the field, wherein the field is in a database division of the plurality of database divisions, and wherein the relationship identifies related fields in other database divisions and identifying documents using a linear database division index to search for the value in the related fields, wherein the linear database division index has a database division index for each of the plurality of database divisions, and wherein each database division index has entries for a value and an associated document; merging the first result set and the second result set to form a merged result set of documents; and displaying the documents from the merged result set in response to the search request.

BRIEF DESCRIPTION OF THE SEVERAL VIEWS OF THE DRAWINGS

Referring now to the drawings in which like reference numbers represent corresponding parts throughout:

FIG. 15 illustrates a computing node in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments identify relationships of data stored in multiple NoSQL databases. Furthermore, embodiments perform a join operation to generate a join result for the data spread across multiple NoSQL databases. Embodiments provide the join operation behavior at the database layer of the server computer.

Figure 1:
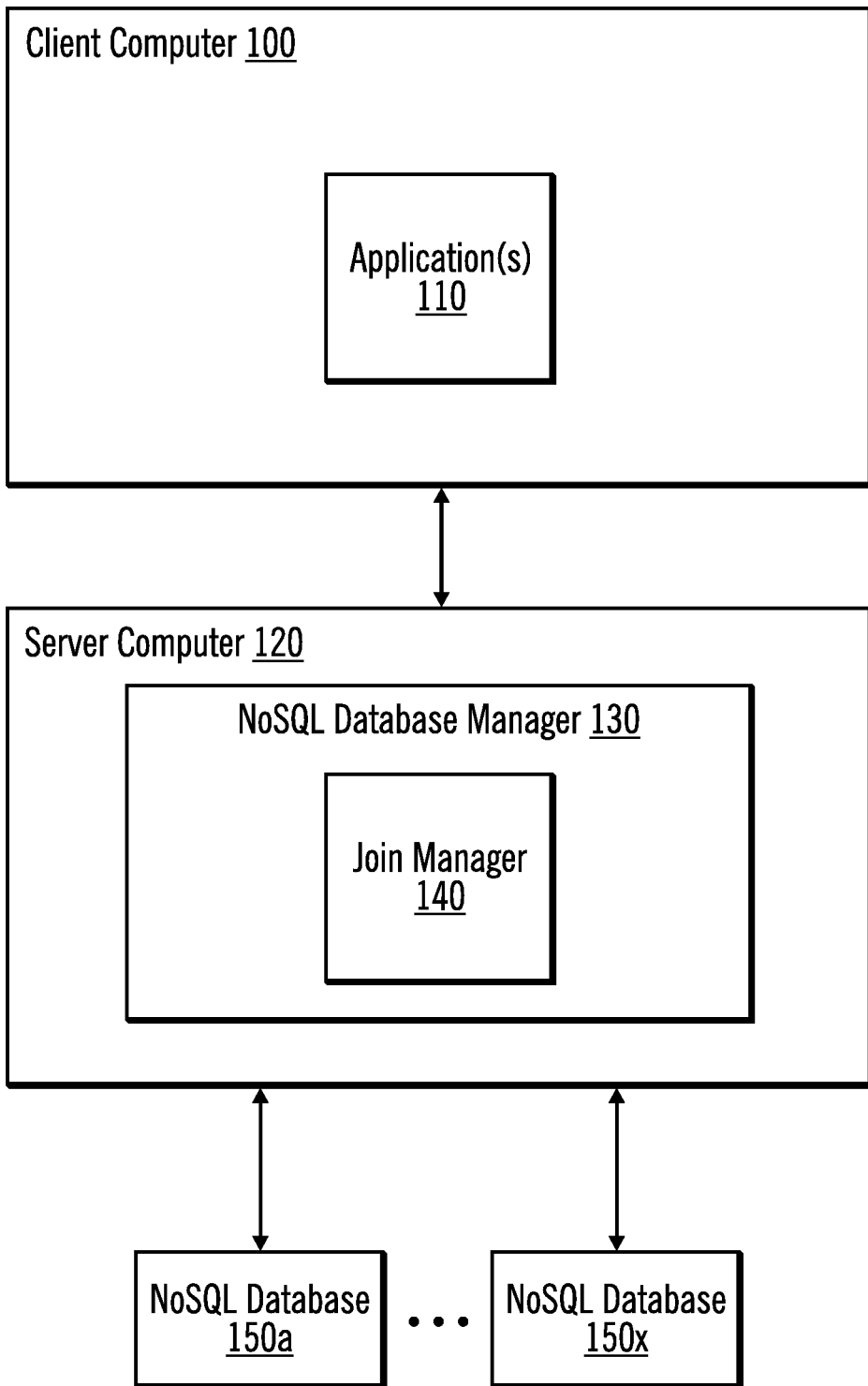
FIG. 1 illustrates, in a block diagram, a computing environment in accordance with certain embodiments.

FIG. 1 illustrates, in a block diagram, a computing environment in accordance with certain embodiments. A client computer 100 is coupled to a server computer 120. The client computer 100 includes one or more applications 110. The server computer 120 includes a NoSQL database manager 130 and is coupled to NoSQL databases 150a . . . 150x. The NoSQL database manager 130 includes a join manager 140.

The join manager 140 provides join operation behavior in a database layer of the server computer 120 for NoSQL databases 150a . . . 150x by:

1. identifying database relationships by schema discovery or using a built-in knowledge base;

2. building a linear database division index with database division indexes (i.e., cross-database indexes), in which each indexed field is based on schema and linkage of an indexed value is based on a schema relationship;

3. constructing an extended database search result using a technique for getting an extended index for a searched term;

4. dynamically updating the database division indexes (i.e., the linear cross-database indexes) to adapt to any change of data in the NoSQL databases 150a . . . 150x.

Figure 2:
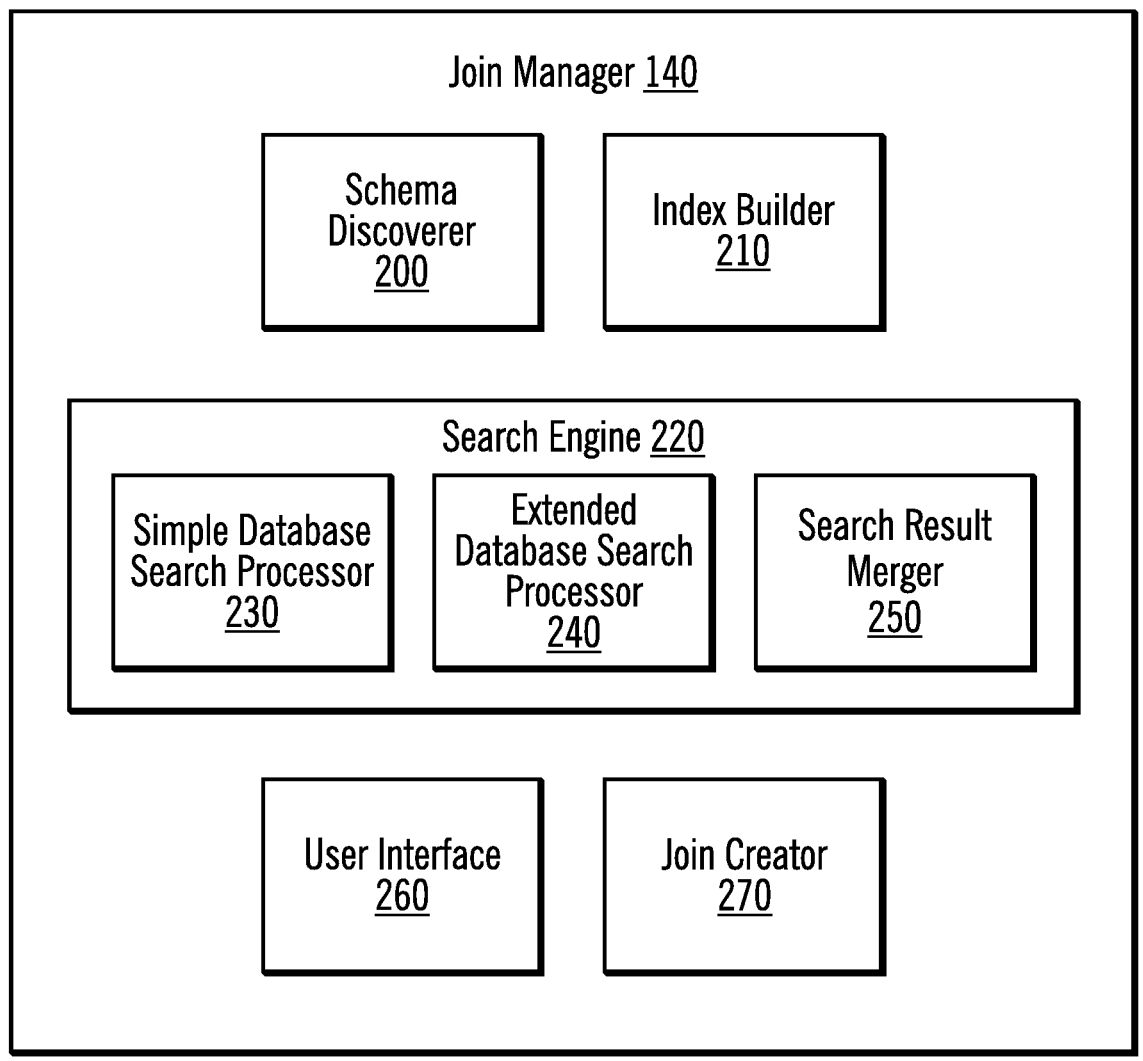
FIG. 2 illustrates, in a block diagram, further details of a join manager in accordance with certain embodiments.

FIG. 2 illustrates, in a block diagram, further details of the join manager 140 in accordance with certain embodiments. The join manager 140 includes a schema discoverer 200, an index builder 210, a search engine 220, a user interface 260, and a join creator 270. The search engine 220 includes a simple database search processor 230, an extended database search processor 240, and a search result merger 250.

The schema discoverer 200 discovers schemas by finding potential relationships that may exist in the NoSQL databases and building the schema based on these relationships.

The index builder 210 builds linear database division index. A linear database division index is not based on the whole database, but based on discovered schema relationships. That is, the linear database division index is based on database divisions, where these database divisions are formed by grouping relationships found with the schema.

The simple database search processor 230 may be used to perform direct search using a query language to search against the structured index.

The extended database search processor 240 may be used to provide an additional search based on extended relationships discovered by the schema discoverer 200.

The search result merger 250 merges search results from the simple database search processor 230 and the extended database search processor 240. The user interface 260 may receive a request for building a linear database division index for NoSQL databases and generates the linear database division index with the database division indexes. The user interface 260 may receive a search request (a query statement) and outputs search results. The search results may be provided in a format specified by the entity that issued the search request or in a default format.

The join creator 270 receives a field through the user interface 260, selects a relation from the schema, issues a join operation on that field across the NoSQL databases, and returns a result.

Figure 3:
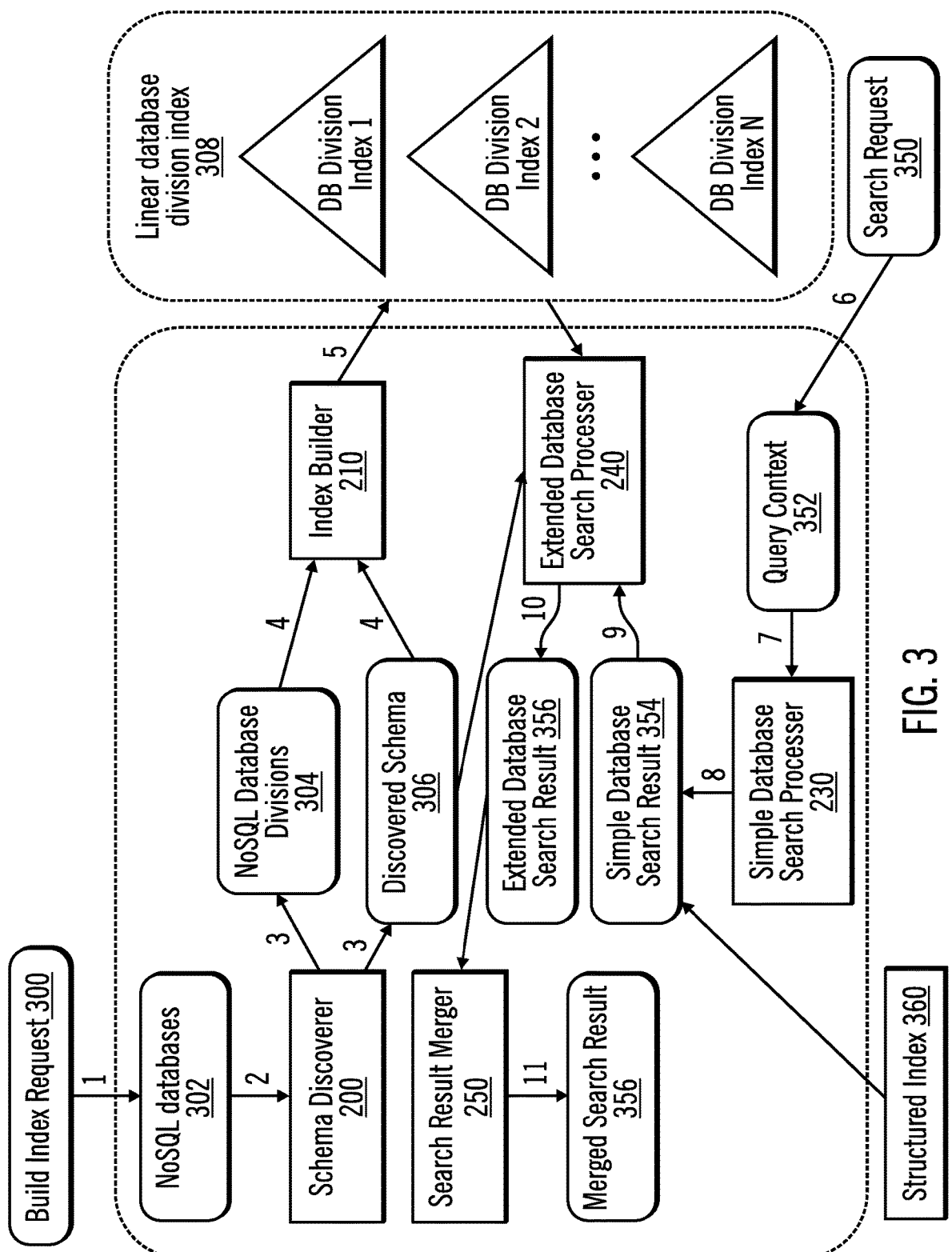
FIG. 3 illustrates operations for building a linear database division index and responding to a search request using the index in accordance with certain embodiments.

FIG. 3 illustrates operations for building a linear database division index 308 and responding to a search request 350 using the linear database division index in accordance with certain embodiments. Initially, the join manager 140 receives a build index request 300 for NoSQL databases 302. The schema discoverer 230 discovers a schema for the documents stored in the NoSQL databases. The schema discoverer 230 outputs NoSQL database divisions 304 and the discovered schema 306. The database divisions 304 are groupings of the NoSQL databases based on relationships. The index builder receives as input the NoSQL database divisions 304 and the discovered schema 306 and outputs the linear database division index 308, with database division index 1 . . . database division index y. With embodiments, a linear database division index is built and updated according to the discovered schema.

Also, the join manager 140 may receive a search request 350. Then, the simple database processor 230 receives the query context 352 as input and outputs a simple database search result 354 (from executing the search request 350 against a structured index 360) from the NoSQL databases. With embodiments, the structured index 360 may be an n-tree index, such as a B-tree index. With embodiments, the query context 352 is a field and a value (e.g., "Field=value"). The extended database search processor 240 receives as input the simple database search result 354 and the discovered schema 306 and uses these with the linear database division index 308 to generate an extended database search result 356. With embodiments, the extended database search processor 240 checks for relationships and searches against the linear database division index 308 to generate the extended database search result 356. The search result merger 250 merges search results from the simple database search result and the extended database search result.

Figure 4:
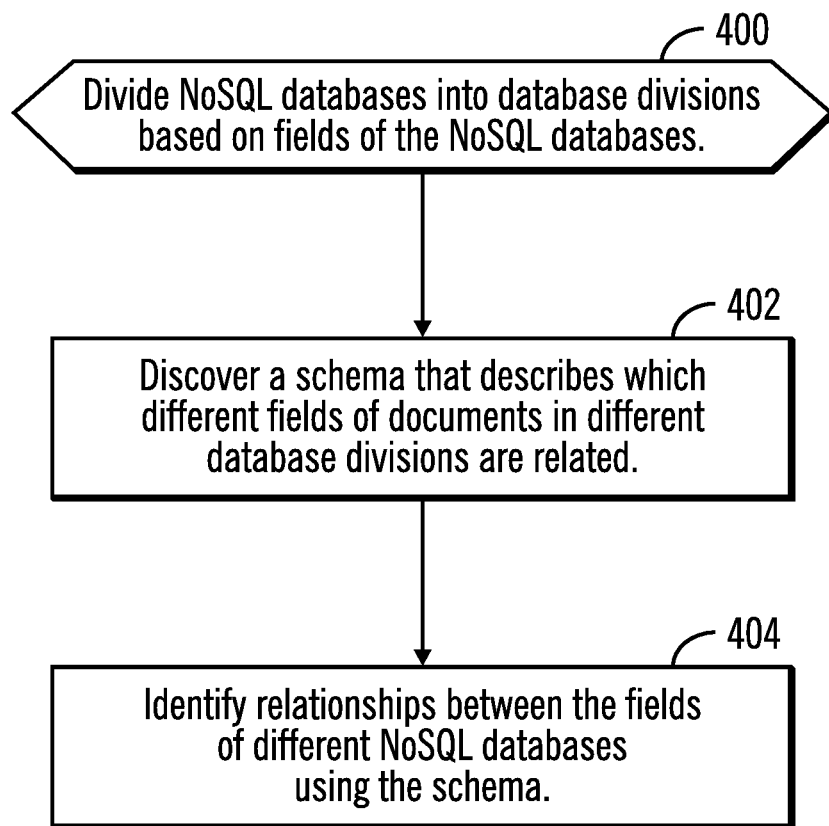
FIG. 4 illustrates, in a flow chart, operations for creating a schema in accordance with certain embodiments.

FIG. 4 illustrates, in a flow chart, operations for creating a schema in accordance with certain embodiments. Control begins at block 400 with the schema discoverer 200 dividing the NoSQL databases into database divisions based on fields of the NoSQL databases. In certain embodiments, there is a database division for each field of each of the NoSQL databases. With embodiments, a field is represented as a column. In block 402, the schema discoverer 200 discovers a schema that describes which different fields of documents in different database divisions are related. With embodiments, the schema is discovered through multi-dimensional columns, value types of columns, value sets, value lengths, and similarity of columns among different NoSQL databases. For example, two fields are related if 1) they are the same dimension (e.g., a single value, a pair, a triple value, etc.), 2) they have a same value type (e.g., integer, string, Boolean, dictionary, tuple, etc.), 3) they have a same value set (e.g., color set, country set, social security number set, etc.), 4) they have a same value length, and 5) there is a similarity of columns (e.g., a match with a regular expression).

In block 404, the schema discoverer 200 identifies relationships between fields of different NoSQL databases using the schema. With embodiments, for each database division of the NoSQL databases, a database division index is built on the relationships. The database division index may be described as an inter-database index as it is built on relationships between NoSQL databases.

With embodiments, the time complexity of performing a search across multiple NoSQL databases is the order of O(M*N), while embodiments build relationships the order of O(M+N), where M is the number of NoSQL databases and N is the number of fields across all of the NoSQL databases.

Figure 5:
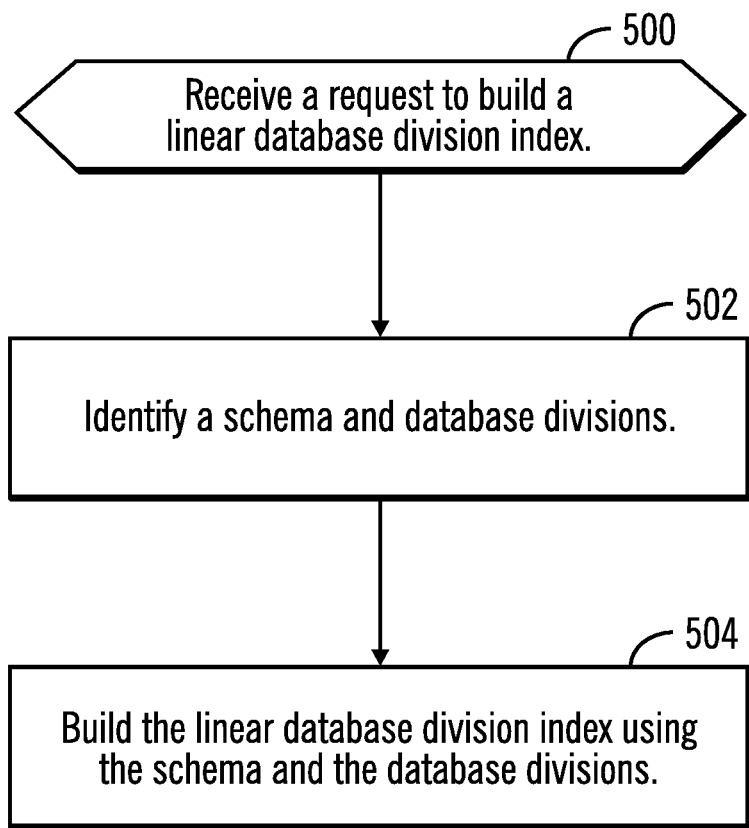
FIG. 5 illustrates, in a flow chart, operations for building an index in accordance with certain embodiments.

FIG. 5 illustrates, in a flow chart, operations for building an index in accordance with certain embodiments. Control begins at block 500 with the index builder 210 receives a request to build a linear database division index. The request to build the linear database division index may be received initially via the user interface 260. In block 502, the index builder 210 identifies a schema and database divisions through schema discovery performed by the schema discoverer 200. In block 204, the index builder 210 builds the linear database division index using the schema and the database divisions. The linear database division index is built on fields identified by the schema.

In certain embodiments, the index builder 210 also builds a view for each document in each of the NoSQL databases, and the view is a pointer copy of the original document. When a view is built, the schema and foreign keys (used for the index) and the join operation are applied to the view, with no effect on the original document. Also, an original document may have multiple views, and an efficient join operation may be selected based on different foreign keys used to build the multiple views.

Figure 6:
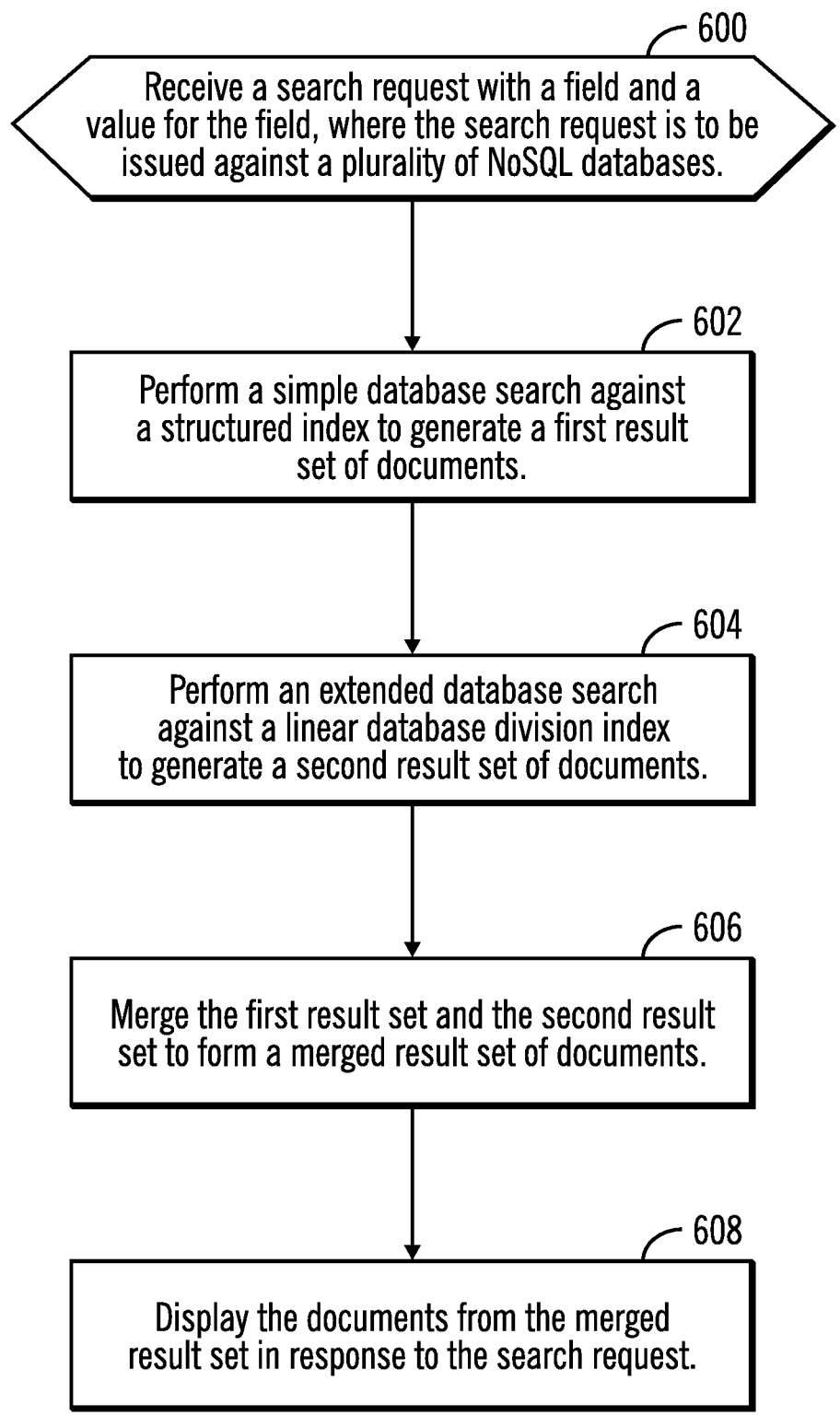
FIG. 6 illustrates, in a flow chart, operations for processing a search request in accordance with certain embodiments.

FIG. 6 illustrates, in a flow chart, operations for processing a search request in accordance with certain embodiments. Control begins at block 600 with the search engine 220 receiving a search request with a field and a value for the field, where the search request is to be issued against a plurality of NoSQL databases. The search request may be received initially via the user interface 260. In block 602, the simple database search processor 230 of the search engine 220 performs a simple database search against a structured index to generate a first result set of documents (i.e., the simple database search results). In block 604, the extended database search processor 240 of the search engine 220 performs an extended database search against a linear database division index to generate a second result set of documents (i.e., the extended database search results). In block 606, the search result merger 250 of the search engine 220 merges the first result set and the second result set to form a merged result set of documents. In block 608, the search result merger 250 displays the documents from the merged result set in response to the search request. Thus, documents found both using the simple database search and using the extended database search are provided in response to the search request. With embodiments, the documents from the merged result set may be provided in another manner than display, such as listed in a report.

With embodiments, the search request is executed at a server computer coupled to the NoSQL databases. This avoids the client computer having to transfer data from the server computer to execute the search request.

Figure 7:
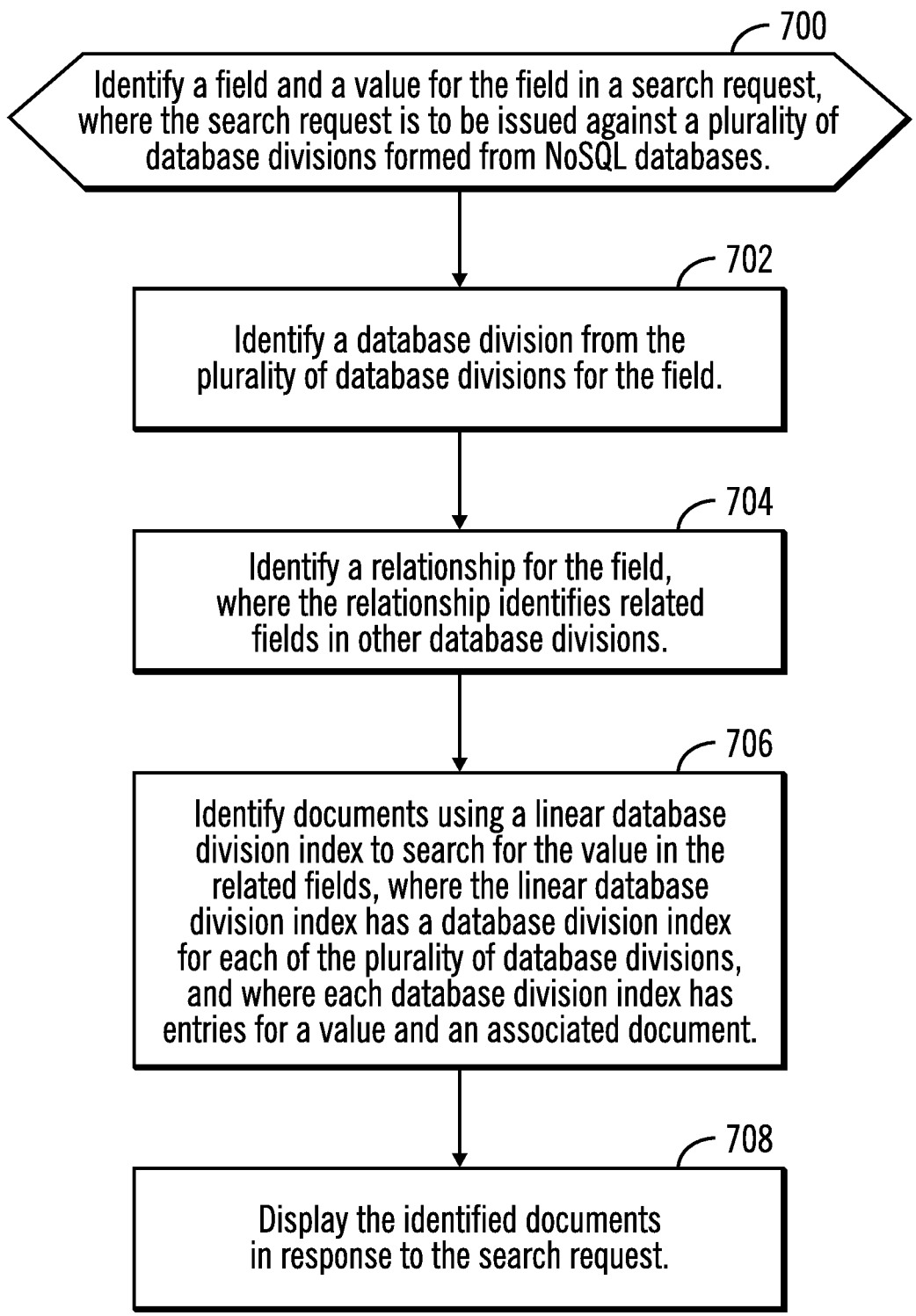
FIG. 7 illustrates, in a flow chart, operations for performing an extended search for a join operation in accordance with certain embodiments.

FIG. 7 illustrates, in a flow chart, operations for performing an extended search for a join operation in accordance with certain embodiments. Control begins at block 700 with the join creator 270 identifying a field and a value for the field in a search request, where the search request is to be issued against a plurality of database divisions formed from NoSQL databases. The field and the value may be received initially via the user interface 260. In block 702, the join creator 270 identifies a database division from the plurality of database divisions for the field. In block 704, the join creator 270 identifies a relationship for the field, where the relationship identifies related fields in other database divisions. In block 706, the join creator 270 identifies documents using a linear database division index to search for the value in the related fields, where the linear database division index has a database division index for each of the plurality of database divisions, and where each database division index has entries for a value and an associated document. In block 708, the join creator 270 displays the identified documents in response to the search request. In this manner, embodiments perform a join operation for a field across NoSQL databases.

Figure 8:
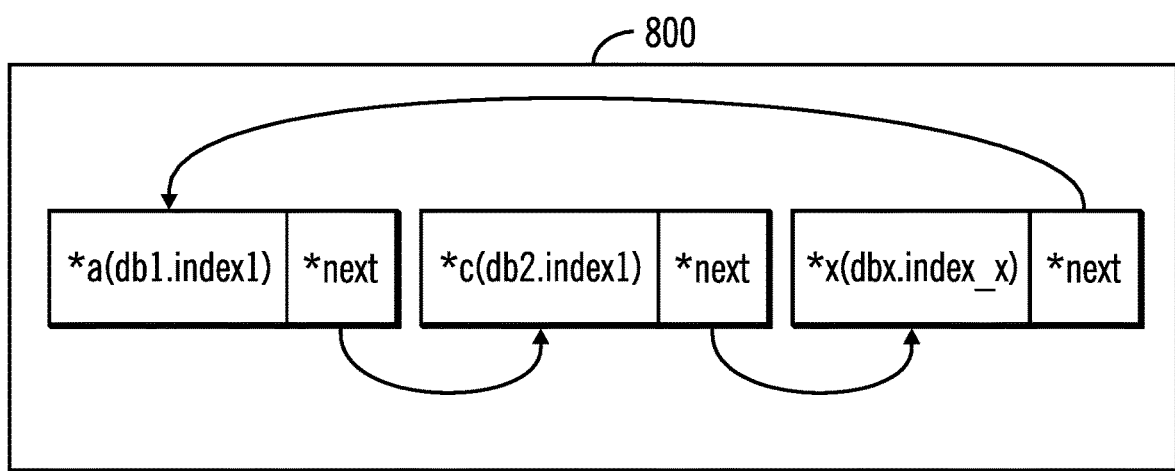
FIG. 8 illustrates an example of a relationship format in accordance with certain embodiments.

FIG. 8 illustrates an example of a relationship format 800 in accordance with certain embodiments. The relationship 800 shows that field *a from database 1 ("db1"), field *c from database 2 ("db2"), and field *x from database x ("dbx") are related. In certain embodiments, the relationship 800 is a linked list, but, in other embodiments, the relationship 800 may be represented with a different structure. With embodiments, "*db.value" is a pointer to a value, "*db.field" is a pointer to a field, and "*next" is a pointer to a field in other NoSQL databases. In FIG. 8, the examples are for fields.

With embodiments, the relationship may be updated in response to any of: a new field being added to a NoSQL database from the NoSQL databases, a new document being added to the NoSQL database, a document being deleted from the NoSQL database, a field being deleted from the NoSQL database, and a name of a field being changed in the NoSQL database.

Figure 9A:
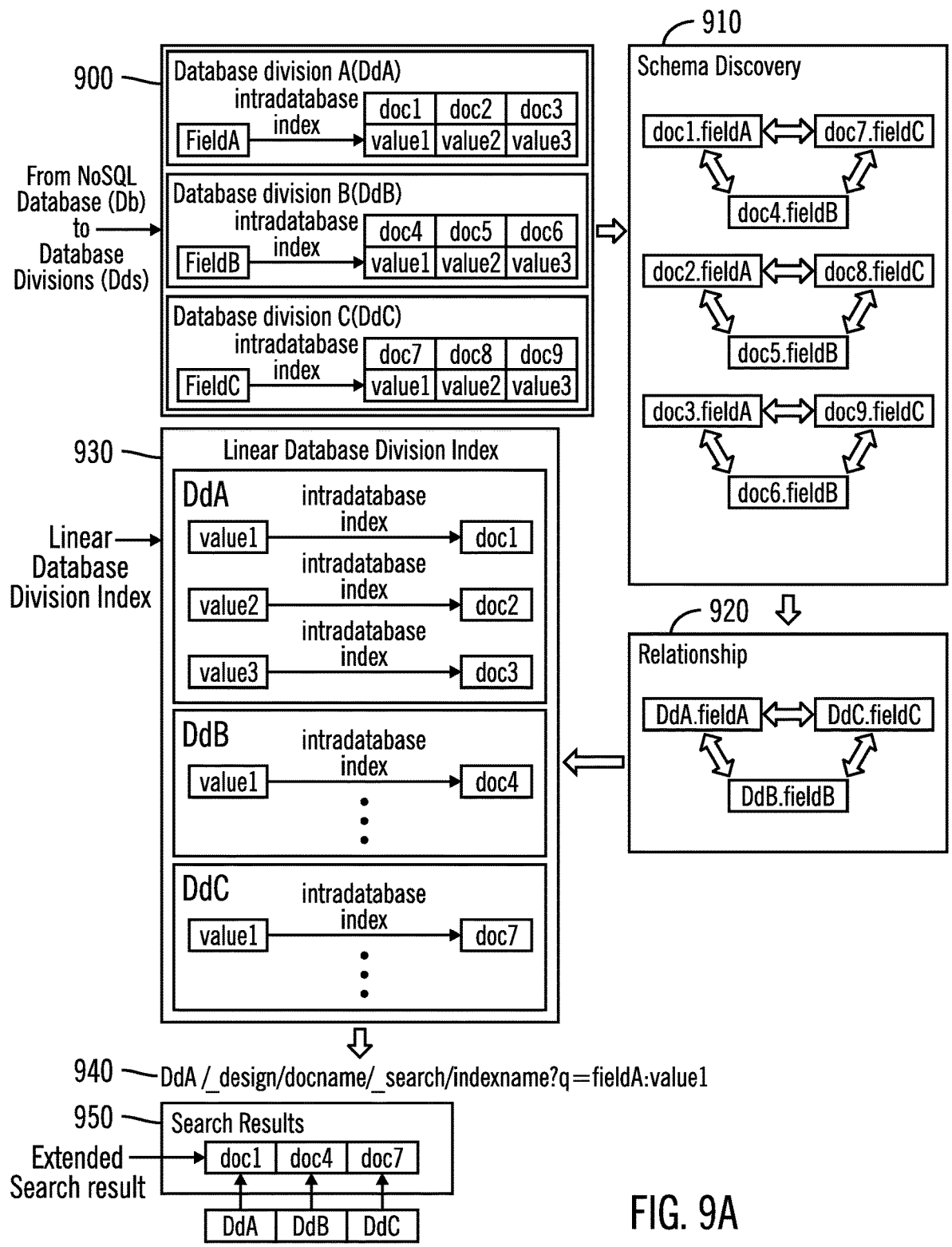
FIG. 9A illustrates an example of a search result in accordance with certain embodiments.

FIG. 9A illustrates an example of a search result in accordance with certain embodiments. Initially, the fields of NoSQL databases are used to generate database divisions 910, with one database division for each of the fields. In this example, there are four database divisions for four fields FieldA, FieldB, FieldC, and FieldD. A database division for a field provides values for that field in documents that include that field. For example, FieldA is found in doc1, doc2, doc3; FieldB is found in doc4, doc5, and doc6; and FieldC is found in doc7, doc8, and doc9.

Then, the database divisions 900 are used to discover a schema 910. The schema 910 describes which different fields of documents in different database divisions are related. The schema 910 is used to discover a relationship 920 across the NoSQL databases. In this example, FieldA is in a relationship with FieldB and FieldC. The relationship 920 and the database divisions 910 are used to create the linear database division index 930, with a database division index for each database division. Then, when a search request 940 identifying a field is received, search result (based on a simple database search and an extended database search) is found. In this example, FieldA with value1 is input for the search request 940. The search result 950 indicates that doc1, which includes FieldA with value1, from database division A is in a relationship with doc4 (with value1 from database division B) and doc7 (with value1 from database division C). With embodiments, the search result 950 is an extended database search result.

Figure 9B:
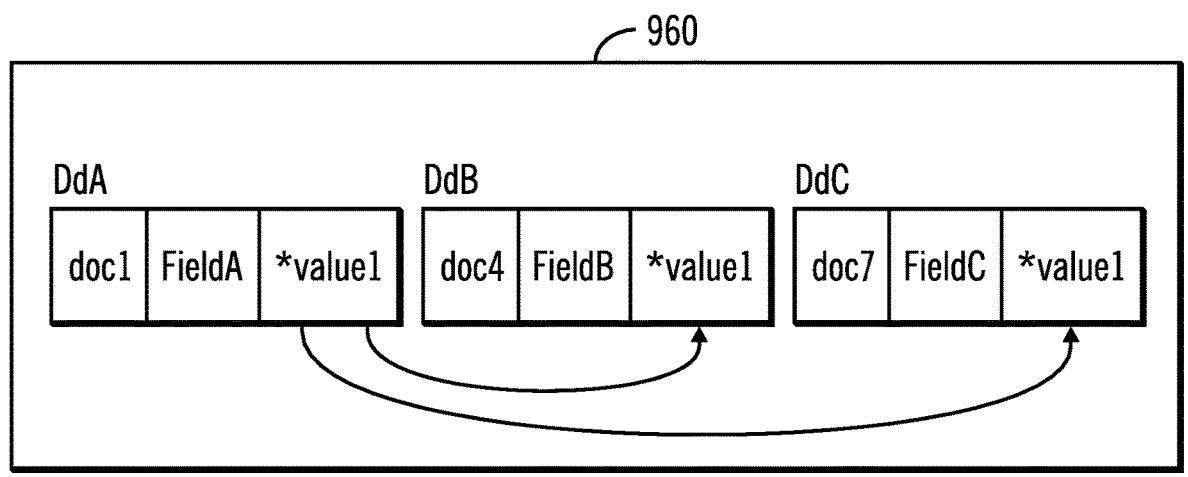
FIG. 9B illustrates a relationship in accordance with certain embodiments.

FIG. 9B illustrates a relationship 960 in accordance with certain embodiments. The relationship 960 shows that FieldA, FieldB, and FieldC are related.

Figure 10A:
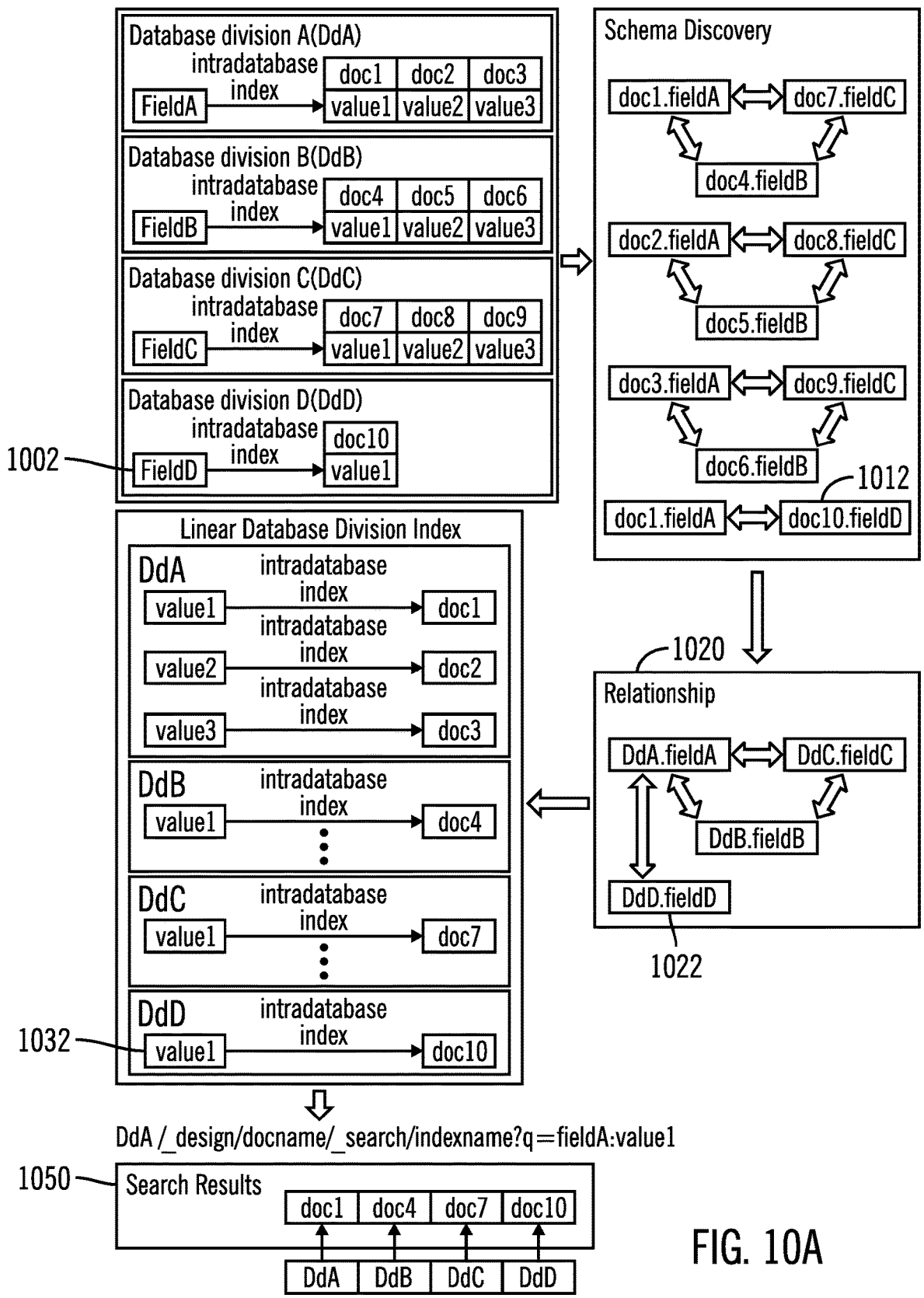
FIG. 10A illustrates adding a new field to a NoSQL database in accordance with certain embodiments.

FIG. 10A illustrates adding a new field to a NoSQL database in accordance with certain embodiments. In FIG. 10A, FieldD is added to a NoSQL database, and this results in a new database division 1002 (DdD) for FieldD. The schema now includes another mapping 1012. The relationships 1020 include new relationships 1022. Thus, in this example, there are two relationships: 1) FieldA is in a relationship with FieldB and FieldC and 2) FieldA is in a relationship with FieldD. The linear database division index includes a new database division index 1032 for the new database division (DdD). In this example, FieldA with value1 is input for the search request, and the search result 1050 indicates that doc1, which includes FieldA with value1, from database division A is in a relationship with doc4 (with value1 from database division B), doc7 (with value1 from database division C), and doc10 (with value 1 from database division D).

Figure 10B:
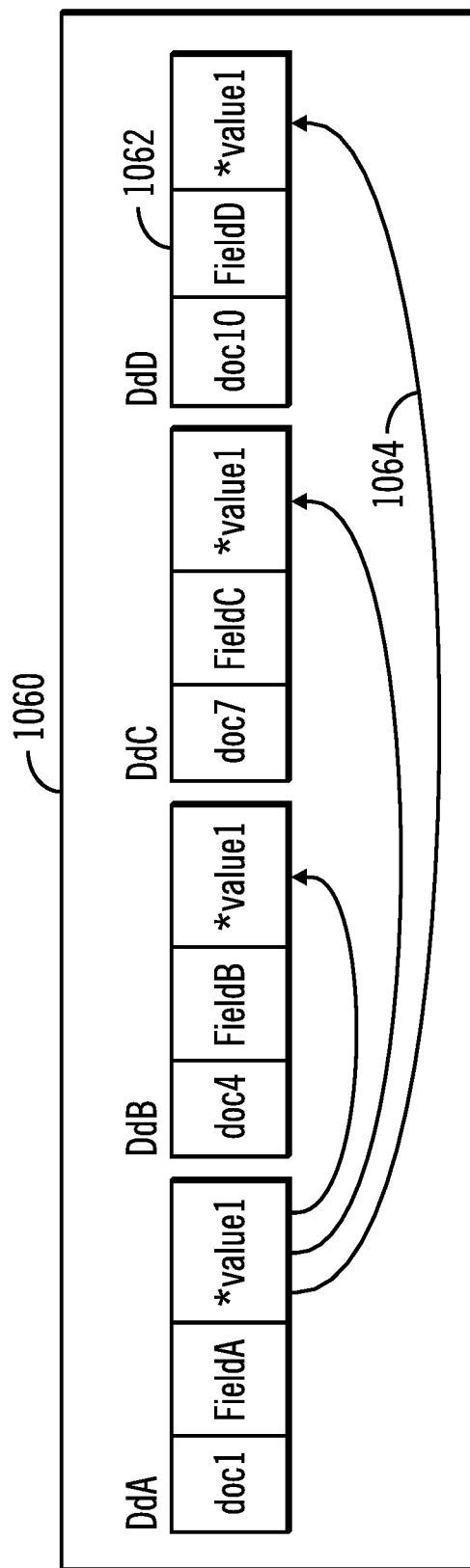
FIG. 10B illustrates a relationship after a new field is added to a NoSQL database in accordance with certain embodiments.

FIG. 10B illustrates a relationship 1060 after a new field is added to a NoSQL database in accordance with certain embodiments. The relationship 1060 now shows an entry for FieldD of doc10 1062 with a new link 1064 to indicate that FieldA, FieldB, FieldC, and FieldD are related.

With embodiments, when a new field is added, the view is updated.

Figure 11A:
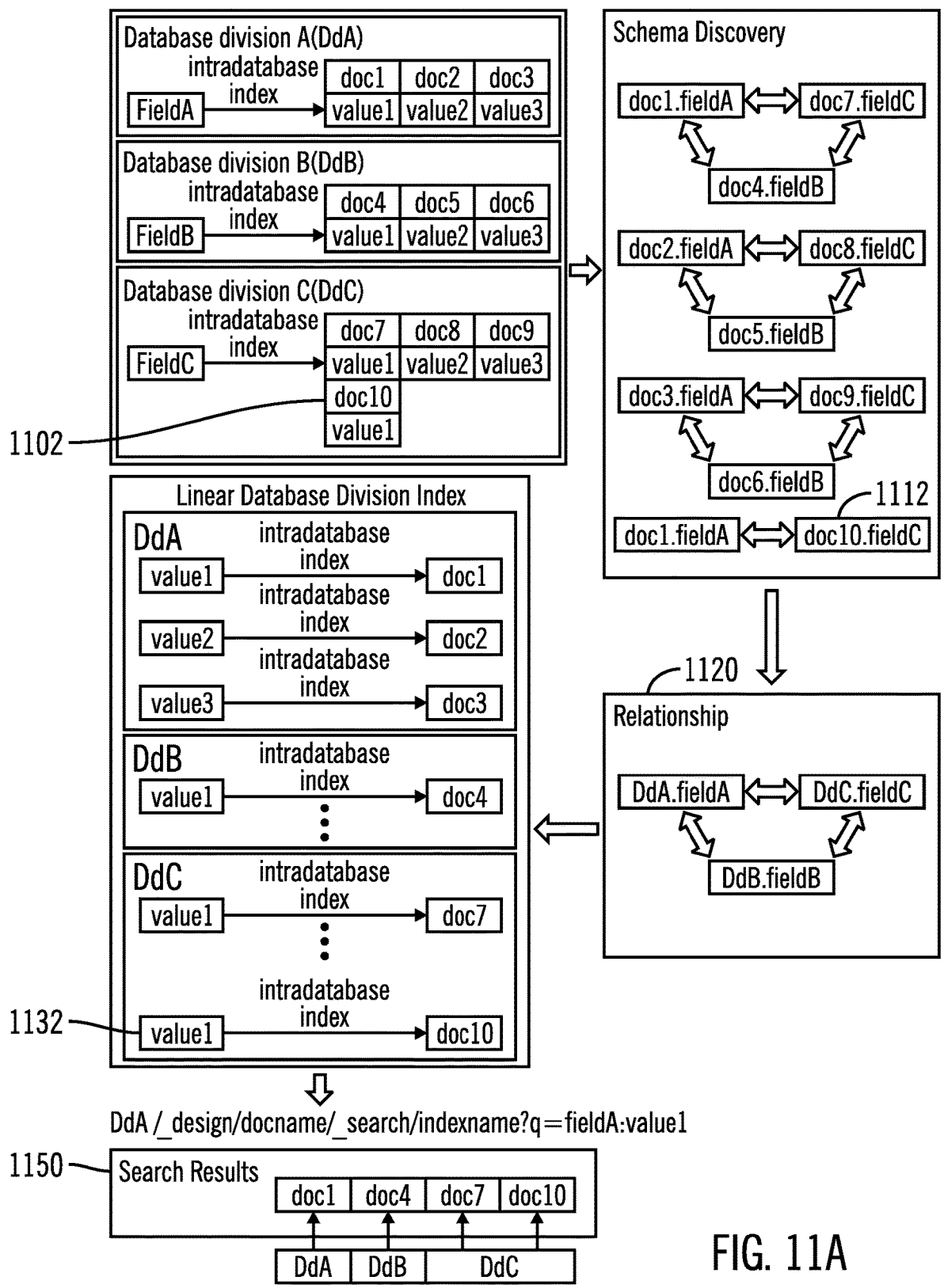
FIG. 11A illustrates adding a new document to a NoSQL database in accordance with certain embodiments.

FIG. 11A illustrates adding a new document to a NoSQL database in accordance with certain embodiments. In this example, a new document is added, but no new fields are added. In this example, doc10 1102 has been added. Doc10 has value 1 for FieldC. The schema includes a new mapping 1112. In this example, the relationship 1120 remains the same (with reference to FIG. 9A). The database division C index includes a new inter-database index entry 1132. In this example, FieldA with value1 is input for the search request, and the search result 1150 indicates that doc1, which includes FieldA with value1, from database division A is in a relationship with doc4 (with value1 from database division B), doc7 (with value1 from database division C), and doc10 (with value 1 from database division C).

Figure 11B:
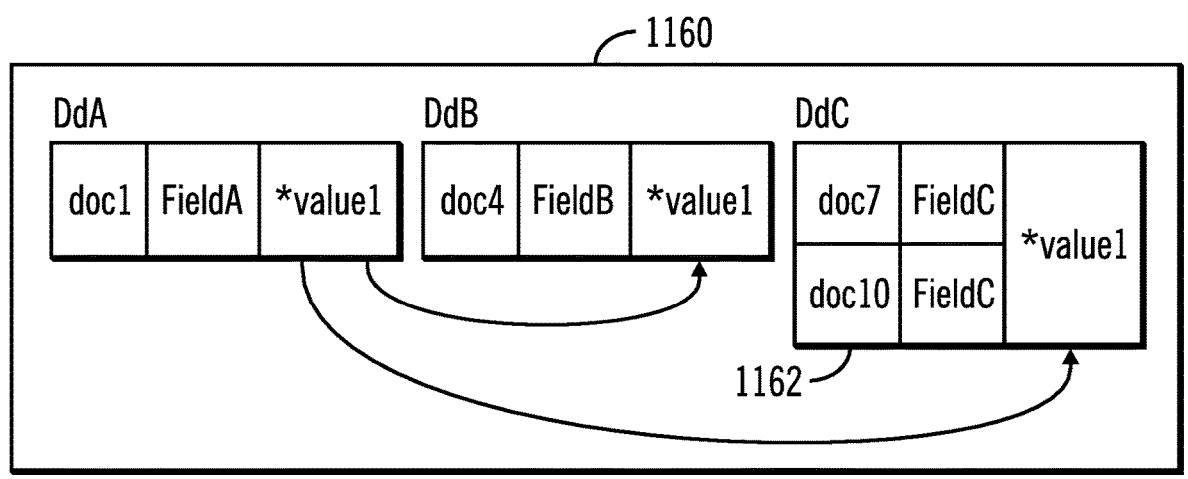
FIG. 11B illustrates a relationship after a new document is added to a NoSQL database in accordance with certain embodiments.

FIG. 11B illustrates a relationship after a new document is added to a NoSQL database in accordance with certain embodiments. The relationship 1160 now shows an entry 1162 for doc10 for Field C.

Figure 12A:
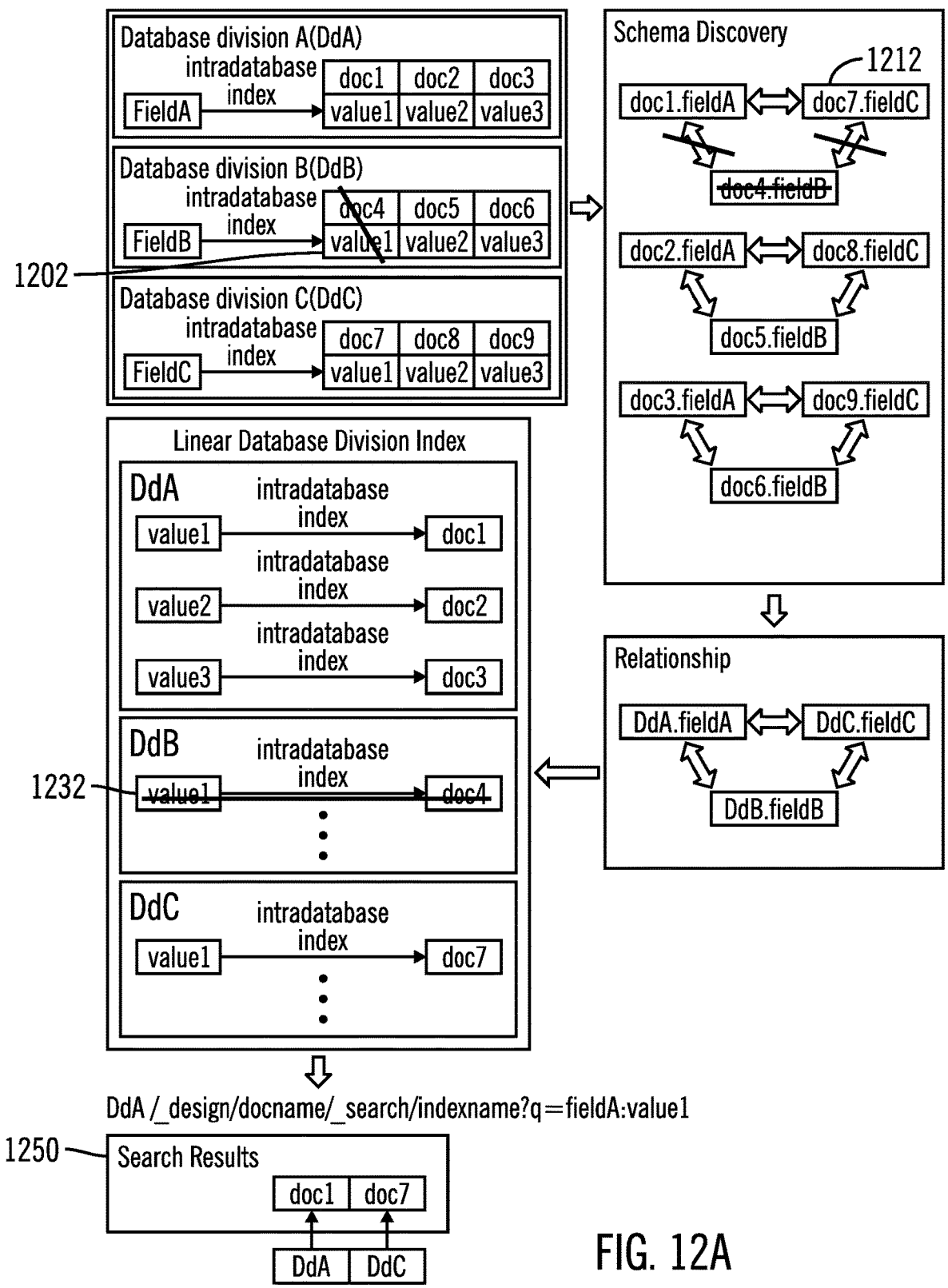
FIG. 12A illustrates adding a document is deleted from a NoSQL database in accordance with certain embodiments.

FIG. 12A illustrates adding a document is deleted from a NoSQL database in accordance with certain embodiments. When a document is deleted, the number of fields do not increase. In this example, doc4 1202 is deleted from a NoSQL database. This removes a mapping 1212 in the schema. Also, an inter-database index entry 1232 for doc4 is removed. In this example, FieldA with value1 is input for the search request, and the search result 1150 indicates that doc1, which includes FieldA with value1, from database division A is in a relationship with doc7 (with value1 from database division C).

Figure 12B:
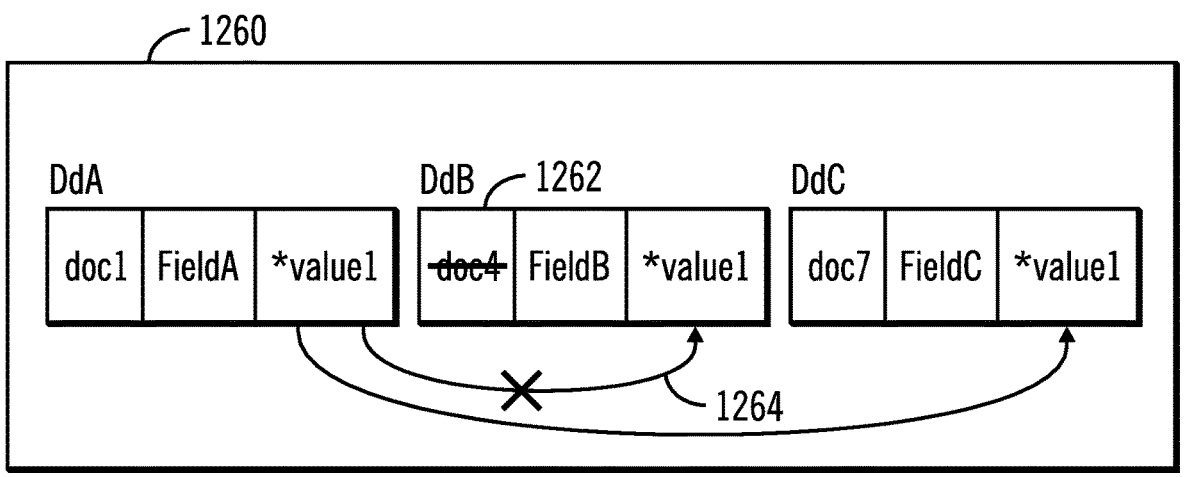
FIG. 12B illustrates a relationship after a document is deleted from a NoSQL database in accordance with certain embodiments.

FIG. 12B illustrates a relationship after a document is deleted from a NoSQL database in accordance with certain embodiments. The relationship 1260 now shows that the entry 1262 and link 1264 for doc4 are removed.

Figure 13A:
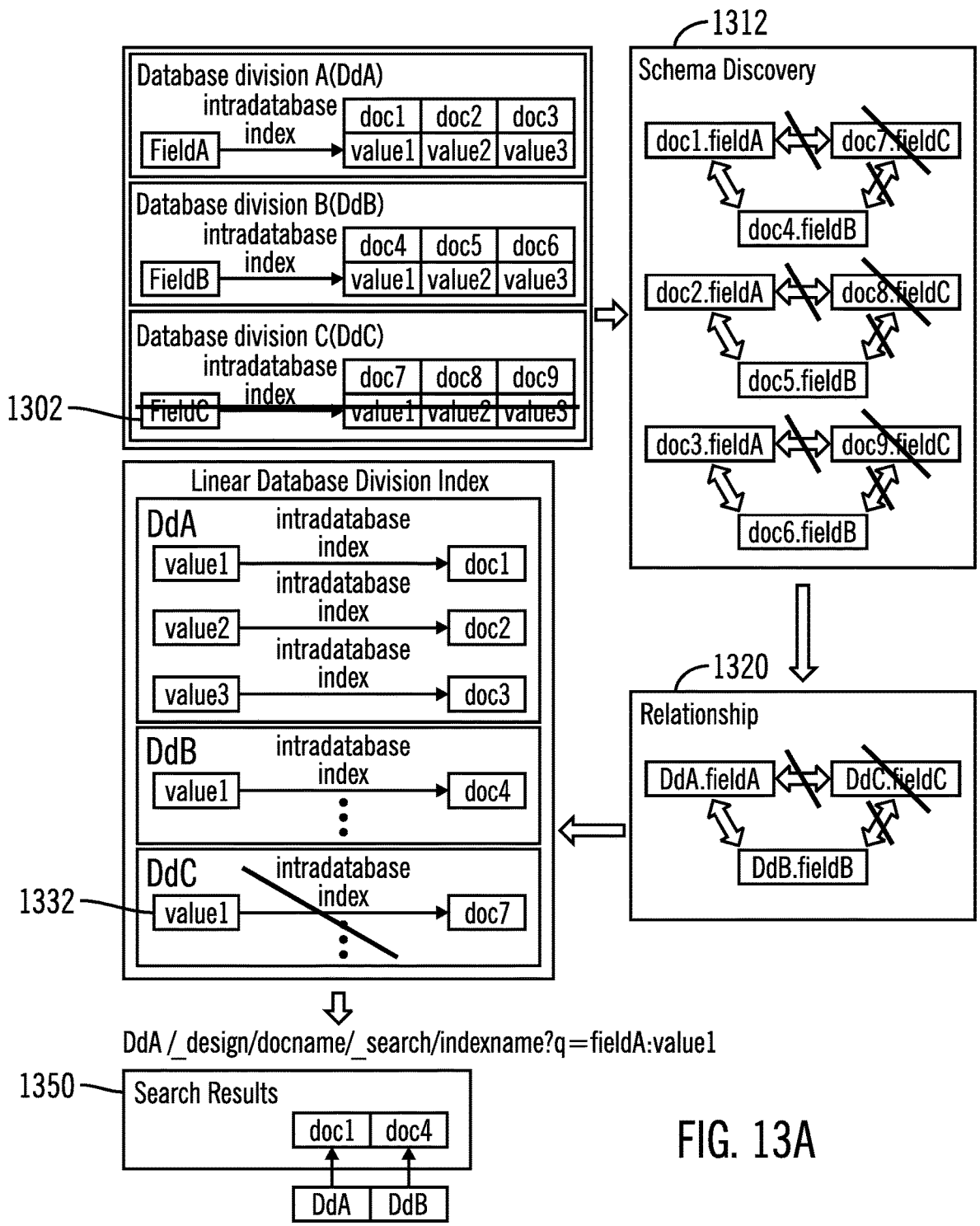
FIG. 13A illustrates adding a field is deleted from a NoSQL database in accordance with certain embodiments.

FIG. 13A illustrates adding a field is deleted from a NoSQL database in accordance with certain embodiments. In this example, FieldC 1302 is deleted, which leads to the database division for FieldC being removed. Mappings 1312 that include FieldC are removed from the schema. The relationship 1320 is modified. Also, the database division index 1332 for Field C is removed. In this example, FieldA with value1 is input for the search request, and the search result 1150 indicates that doc1, which includes FieldA with value1, from database division A is in a relationship with doc4 (with value1 from database division B).

Figure 13B:
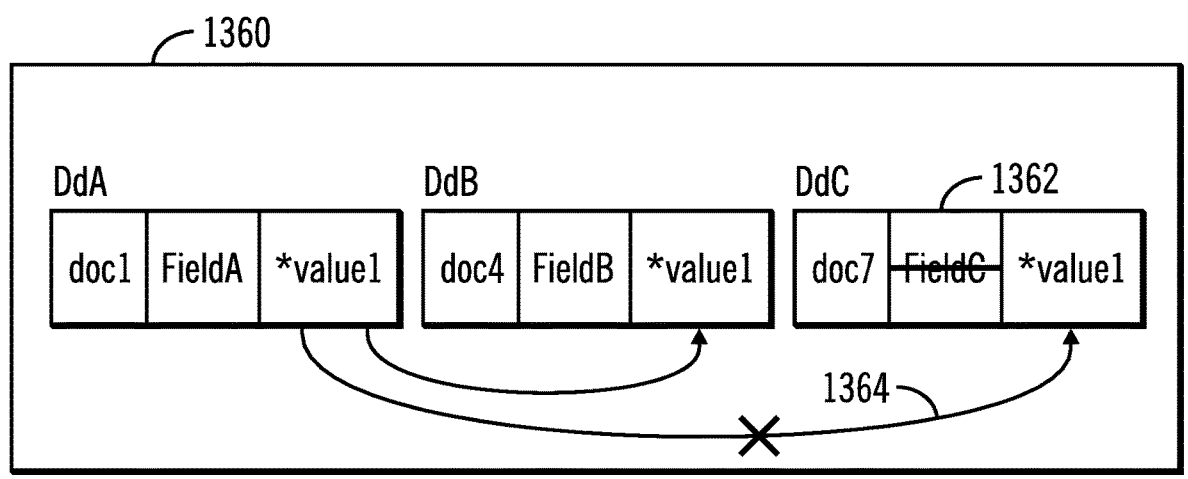
FIG. 13B illustrates a relationship after a field is deleted from a NoSQL database in accordance with certain embodiments.

FIG. 13B illustrates a relationship after a field is deleted from a NoSQL database in accordance with certain embodiments. The relationship 1360 now shows that the entry 1362 and ling 1364 for FieldC are removed.

With embodiments, when a field is deleted, the view is updated.

Figure 14A:
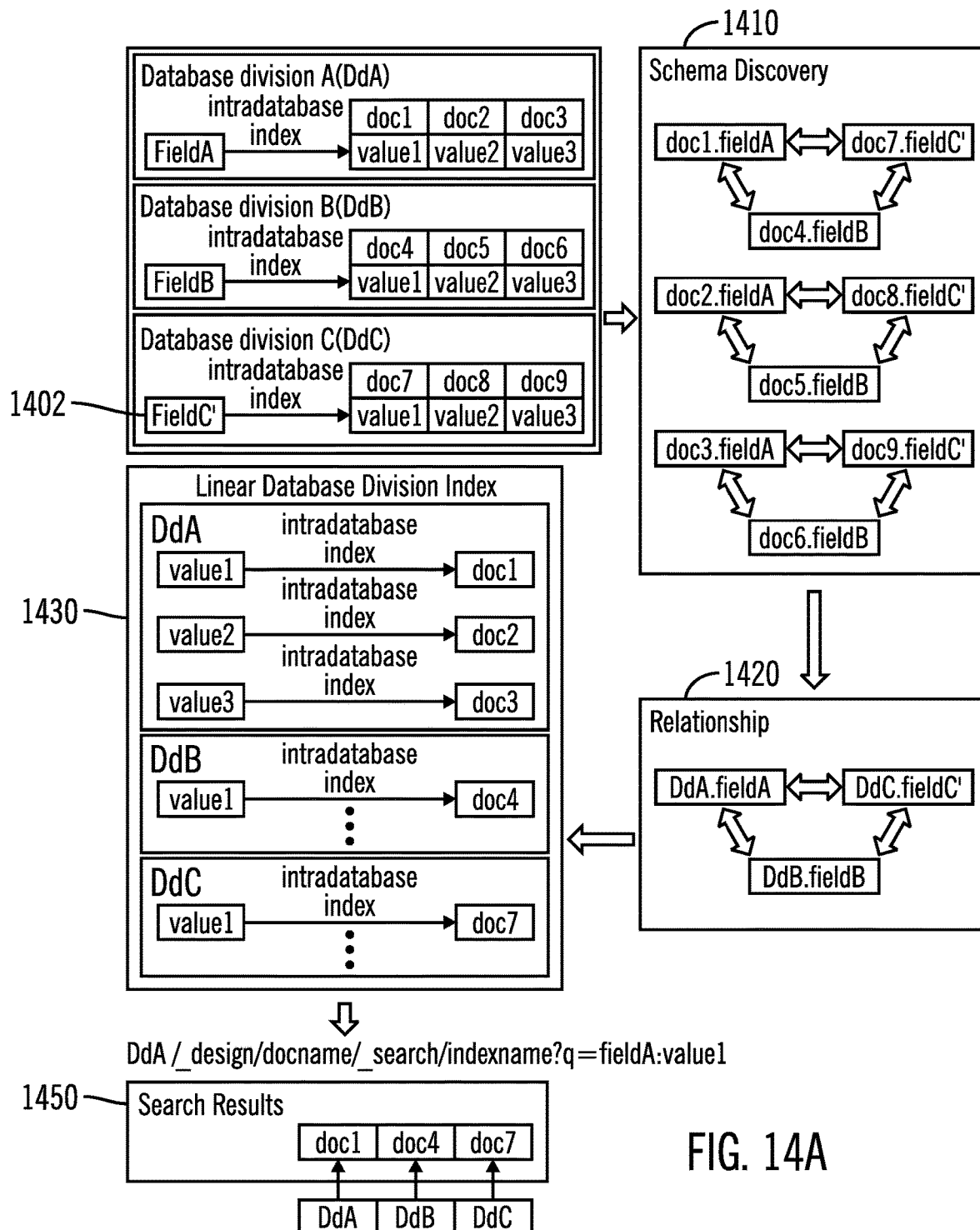
FIG. 14A illustrates changing a field name in a NoSQL database in accordance with certain embodiments.

FIG. 14A illustrates changing a field name in a NoSQL database in accordance with certain embodiments. In this example, FieldC has changed to FieldC', and this results in the name being changed in the database division 1402, in the schema 1410, and in the relationship 1420. There is no change to the linear database division index 1430. In this example, FieldA with value1 is input for the search request 940. The search result 1440 indicates that doc1, which includes FieldA with value1, from database division A is in a relationship with doc4 (with value1 from database division B) and doc7 (with value1 from database division C).

Figure 14B:
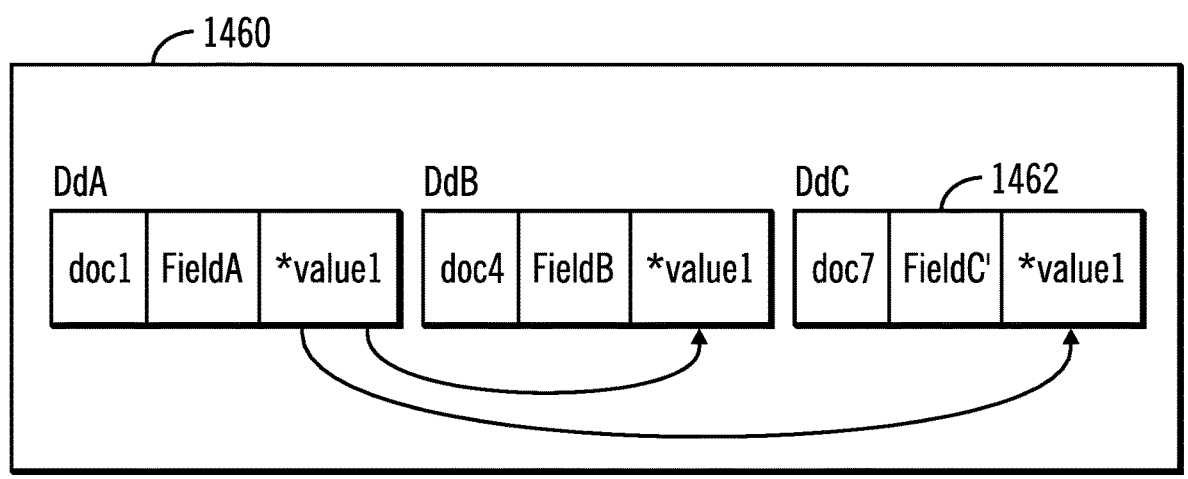
FIG. 14B illustrates a relationship after changing a field name in a NoSQL database in accordance with certain embodiments.

FIG. 14B illustrates a relationship after changing a field name in a NoSQL database in accordance with certain embodiments. The relationship 1462 now shows that FieldC has changed to FieldC' in the entry 1462.

With embodiments, there is no complex logic to be written in the application level. Also, embodiments adapt to changes in the NoSQL database (such as adding a new field, adding a new document, deleting a document, deleting a field, and changing a name of a field). Embodiments automatically identify relationship between fields of documents to enable a join operation across different NoSQL databases at a database level. Embodiments reduce program development workload and improve query efficiency. Embodiments provide better computer processing performance and save on storage because there is no need to transfer intermediate data from the NoSQL databases at the server computer to the application at the client computer.

Embodiments build the linear database division index based on common fields. Embodiments then join NoSQL databases by using schema and the linear database division index.

Embodiments support a join operation against multiple NoSQL databases in the database layer. Embodiments first analyze the schema of NoSQL databases by schema discovery or built-in knowledge base. Second, embodiments divide the NoSQL databases into multiple database divisions with similar schemas. Third, embodiments build relationships of documents and a linear cross-database index, where every database division has its own database division index and the index field is based on the relationship of the database division. There is linkage relationship between the schema relationship and the linear database division index. Once the data is changed in a NoSQL database, the linear database division index and relationships are updated dynamically. When a search request for a field is received, embodiments first search a simple database to generate a simple database search result then check extended relationships by searching against the linear database division index to generate an extended database search result. Moreover, embodiments return a merged search result that merges both the simple database search result and the extended database search result.

FIG. 15 illustrates a computing environment 1510 in accordance with certain embodiments. In certain embodiments, the computing environment is a cloud computing environment. Referring to FIG. 15, computer node 1512 is only one example of a suitable computing node and is not intended to suggest any limitation as to the scope of use or functionality of embodiments of the invention described herein. Regardless, computer node 1512 is capable of being implemented and/or performing any of the functionality set forth hereinabove.

The computer node 1512 may be a computer system, which is operational with numerous other general purpose or special purpose computing system environments or configurations. Examples of well-known computing systems, environments, and/or configurations that may be suitable for use with computer node 1512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1512 may be described in the general context of computer system executable instructions, such as program modules, being executed by a computer system. Generally, program modules may include routines, programs, objects, components, logic, data structures, and so on that perform particular tasks or implement particular abstract data types. Computer node 1512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer node 1512 is shown in the form of a general-purpose computing device. The components of computer node 1512 may include, but are not limited to, one or more processors or processing units 1516, a system memory 1528, and a bus 1518 that couples various system components including system memory 1528 to one or more processors or processing units 1516.

Bus 1518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1512 typically includes a variety of computer system readable media. Such media may be any available media that is accessible by computer node 1512, and it includes both volatile and non-volatile media, removable and non-removable media.

System memory 1528 can include computer system readable media in the form of volatile memory, such as random access memory (RAM) 1530 and/or cache memory 1532. Computer node 1512 may further include other removable/non-removable, volatile/non-volatile computer system storage media. By way of example only, storage system 1534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1518 by one or more data media interfaces. As will be further depicted and described below, system memory 1528 may include at least one program product having a set (e.g., at least one) of program modules that are configured to carry out the functions of embodiments of the invention.

Program/utility 1540, having a set (at least one) of program modules 1542, may be stored in system memory 1528 by way of example, and not limitation, as well as an operating system, one or more application programs, other program modules, and program data. Each of the operating system, one or more application programs, other program modules, and program data or some combination thereof, may include an implementation of a networking environment. Program modules 1542 generally carry out the functions and/or methodologies of embodiments of the invention as described herein.

Computer node 1512 may also communicate with one or more external devices 1514 such as a keyboard, a pointing device, a display 1524, etc.; one or more devices that enable a user to interact with computer node 1512; and/or any devices (e.g., network card, modem, etc.) that enable computer node 1512 to communicate with one or more other computing devices. Such communication can occur via Input/Output (I/O) interfaces 1522. Still yet, computer node 1512 can communicate with one or more networks such as a local area network (LAN), a general wide area network (WAN), and/or a public network (e.g., the Internet) via network adapter 1520. As depicted, network adapter 1520 communicates with the other components of computer node 1512 via bus 1518. It should be understood that although not shown, other hardware and/or software components could be used in conjunction with computer node 1512. Examples, include, but are not limited to: microcode, device drivers, redundant processing units, external disk drive arrays, RAID systems, tape drives, and data archival storage systems, etc.

In certain embodiments, the client computer 100 and the server computer 120 each has the architecture of computer node 1512. In certain embodiments, the client computer 100 and the server computer 120 are part of a cloud infrastructure. In certain alternative embodiments, the client computer 100 and the server computer 120 are not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 16:
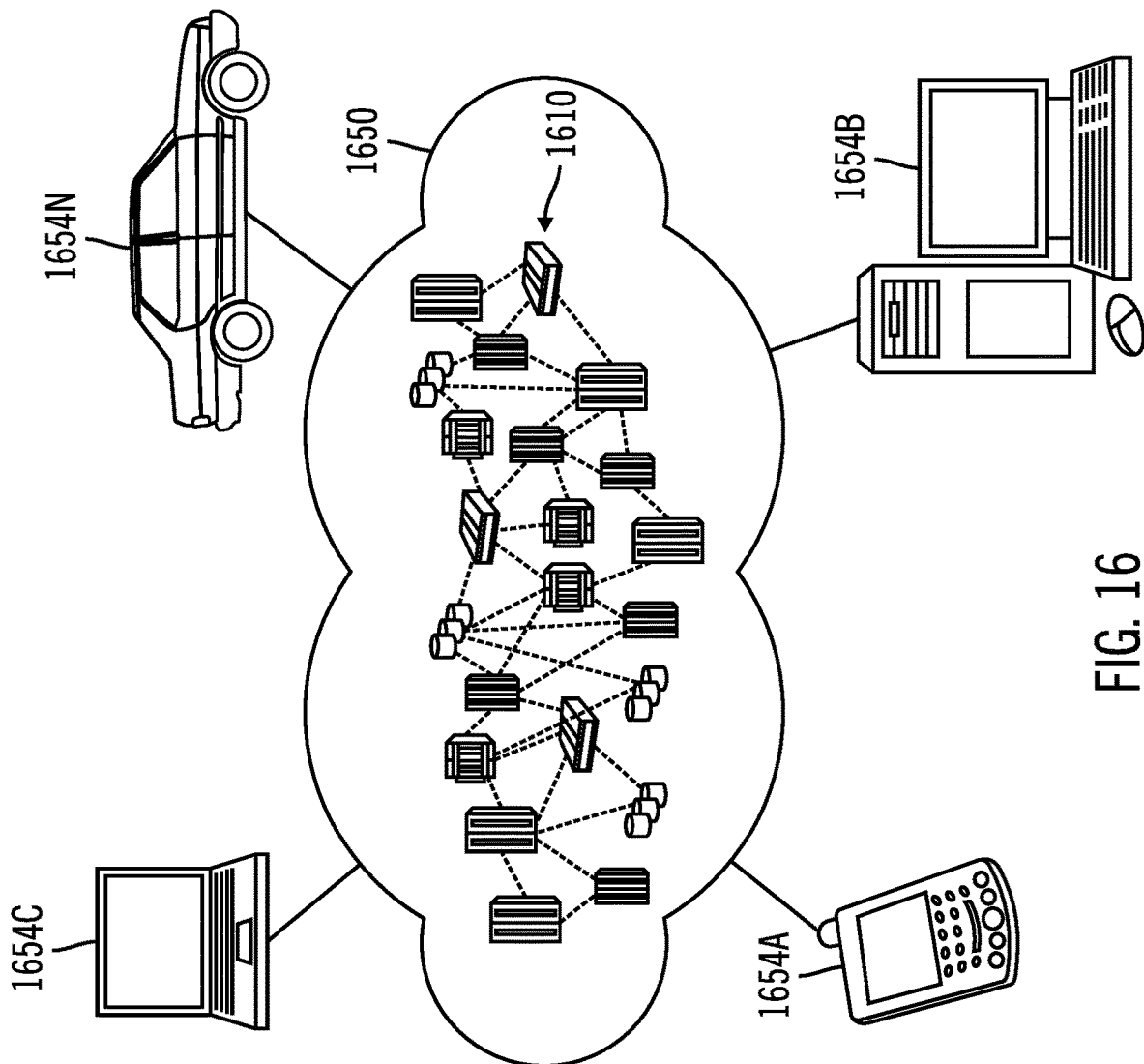
FIG. 16 illustrates a cloud computing environment in accordance with certain embodiments.

Referring now to FIG. 16, illustrative cloud computing environment 1650 is depicted. As shown, cloud computing environment 1650 includes one or more cloud computing nodes 1610 with which local computing devices used by cloud consumers, such as, for example, personal digital assistant (PDA) or cellular telephone 1654A, desktop computer 1654B, laptop computer 1654C, and/or automobile computer system 1654N may communicate. Nodes 1610 may communicate with one another. They may be grouped (not shown) physically or virtually, in one or more networks, such as Private, Community, Public, or Hybrid clouds as described hereinabove, or a combination thereof. This allows cloud computing environment 1650 to offer infrastructure, platforms and/or software as services for which a cloud consumer does not need to maintain resources on a local computing device. It is understood that the types of computing devices 1654A-N shown in FIG. 16 are intended to be illustrative only and that computing nodes 1610 and cloud computing environment 1650 can communicate with any type of computerized device over any type of network and/or network addressable connection (e.g., using a web browser).

Figure 17:
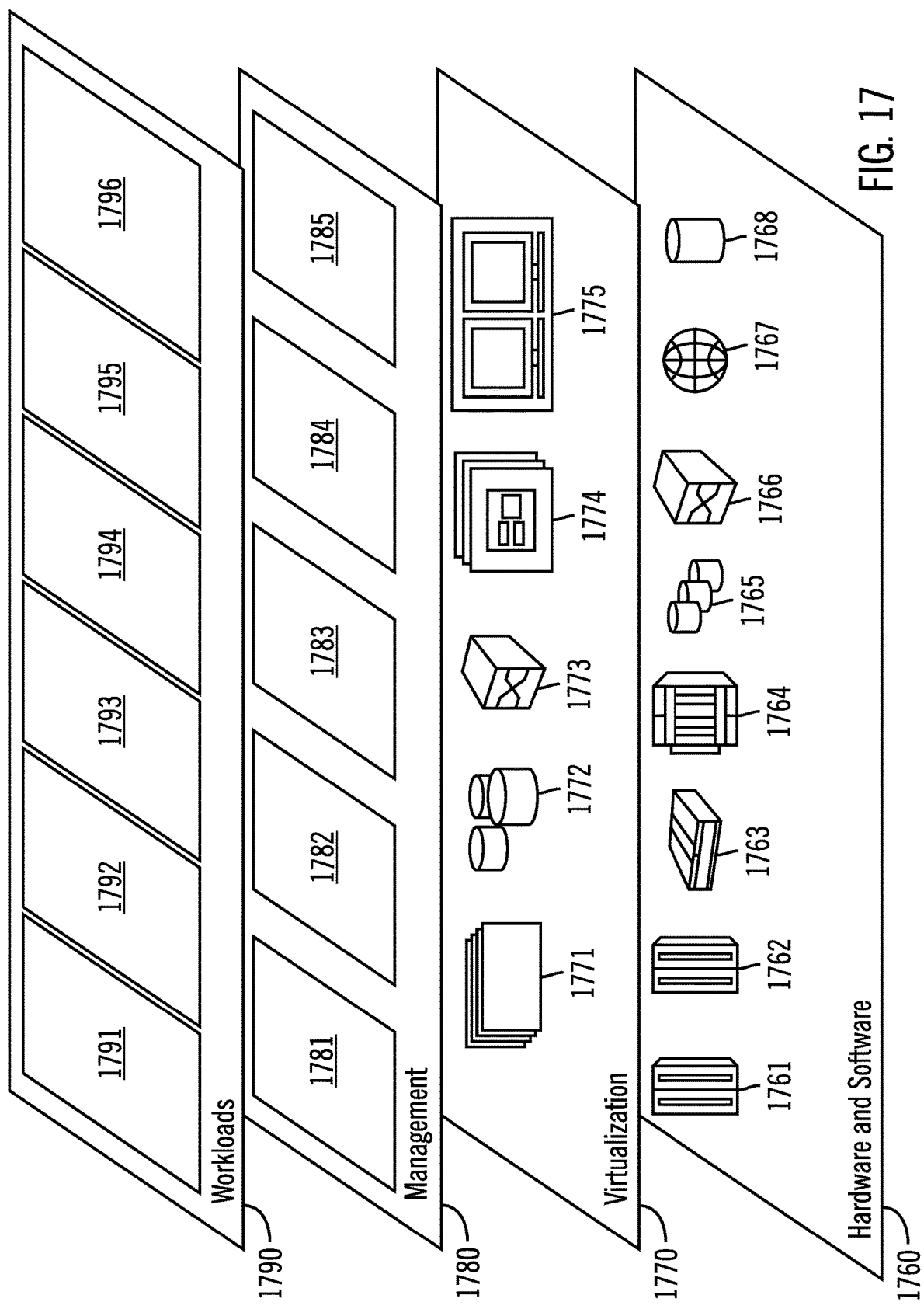
FIG. 17 illustrates abstraction model layers in accordance with certain embodiments.

Referring now to FIG. 17, a set of functional abstraction layers provided by cloud computing environment 1650 (FIG. 16) is shown. It should be understood in advance that the components, layers, and functions shown in FIG. 17 are intended to be illustrative only and embodiments of the invention are not limited thereto. As depicted, the following layers and corresponding functions are provided:

Hardware and software layer 1760 includes hardware and software components. Examples of hardware components include: mainframes 1761; RISC (Reduced Instruction Set Computer) architecture based servers 1762; servers 1763; blade servers 1764; storage devices 1765; and networks and networking components 1766. In some embodiments, software components include network application server software 1767 and database software 1768.

Virtualization layer 1770 provides an abstraction layer from which the following examples of virtual entities may be provided: virtual servers 1771; virtual storage 1772; virtual networks 1773, including virtual private networks; virtual applications and operating systems 1774; and virtual clients 1775.

In one example, management layer 1780 may provide the functions described below. Resource provisioning 1781 provides dynamic procurement of computing resources and other resources that are utilized to perform tasks within the cloud computing environment. Metering and Pricing 1782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1783 provides access to the cloud computing environment for consumers and system administrators. Service level management 1784 provides cloud computing resource allocation and management such that required service levels are met. Service Level Agreement (SLA) planning and fulfillment 1785 provide pre-arrangement for, and procurement of, cloud computing resources for which a future requirement is anticipated in accordance with an SLA.

Workloads layer 1790 provides examples of functionality for which the cloud computing environment may be utilized. Examples of workloads and functions which may be provided from this layer include: mapping and navigation 1791; software development and lifecycle management 1792; virtual classroom education delivery 1793; data analytics processing 1794; transaction processing 1795; and supporting a join operation against multiple NoSQL databases 1796.

Thus, in certain embodiments, software or a program, implementing supporting a join operation against multiple NoSQL databases in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
receiving, using a processor of a computer, a search request with a field and a value for the field, wherein the search request is to be issued against a plurality of database divisions formed from NoSQL databases;
in response to receiving the search request,
performing a simple database search against a structured index using the field and the value to generate a first result set of documents;
performing an extended database search against a linear database division index using the field and the value to generate a second result set of related documents set by:
identifying a relationship for the field, wherein the field is in a database division of the plurality of database divisions, and wherein the relationship identifies related fields in other database divisions; and
identifying documents using a linear database division index to search for the value in the related fields, wherein the linear database division index has a database division index for each of the plurality of database divisions, and wherein each database division index has entries for a particular value and an associated document;
merging the first result set of documents and the second result set of related documents to form a merged result set of documents; and
displaying the documents from the merged result set of documents in response to the search request.

2. The computer-implemented method of claim 1, further comprising:
dividing the NoSQL databases into the database divisions based on fields of the NoSQL databases; and
discovering a schema that describes which different fields of documents in different database divisions are related.

3. The computer-implemented method of claim 2, further comprising:
identifying relationships between the different fields.

4. The computer-implemented method of claim 1, further comprising:
receiving a request to build the linear database division index;
identifying a schema and the database divisions; and
building the linear database division index using the schema and the database divisions.

5. The computer-implemented method of claim 1, wherein the search request is executed at a server computer coupled to the NoSQL databases.

6. The computer-implemented method of claim 1, wherein the relationship is updated in response to any of: a new field being added to a NoSQL database from the NoSQL databases, a new document being added to the NoSQL database, a particular document being deleted from the NoSQL database, a particular field being deleted from the NoSQL database, and a name of a particular field being changed in the NoSQL database.

7. The computer-implemented method of claim 1, wherein a Software as a Service (SaaS) is configured to perform method operations.

* * * * *